United States Patent
Guthörle et al.

(10) Patent No.: US 12,180,883 B2
(45) Date of Patent: Dec. 31, 2024

(54) CONTROL DEVICE OF AN EXHAUST GAS-CONDUCTING SECTION OF AN EXHAUST GAS TURBOCHARGER

(71) Applicants: IHI Charging Systems International GmbH, Amt Wachsenburg OT Ichtershausen (DE); Mercedes-Benz Group AG, Stuttgart (DE)

(72) Inventors: Manfred Guthörle, Neckarbischofsheim (DE); Viktor Dick, Plankstadt (DE); Stephan Weniger, St. Leon-Rot (DE); Zdenek Reif, Neckargemünd (DE); Nils Brinkert, Ludwigsburg (DE); Jürgen Weeber, Neckarsulm (DE); Thomas Knieps, Allmersbach im Tal (DE)

(73) Assignees: IHI Charging Systems International GmbH, Ichtershausen (DE); Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/287,480

(22) PCT Filed: Jun. 8, 2022

(86) PCT No.: PCT/DE2022/100427
§ 371 (c)(1),
(2) Date: Oct. 19, 2023

(87) PCT Pub. No.: WO2023/274446
PCT Pub. Date: Jan. 5, 2023

(65) Prior Publication Data
US 2024/0384680 A1 Nov. 21, 2024

(30) Foreign Application Priority Data

Jul. 1, 2021 (DE) .................. 10 2021 117 020.6

(51) Int. Cl.
*F02B 37/18* (2006.01)
*F02B 37/02* (2006.01)

(52) U.S. Cl.
CPC ............ *F02B 37/18* (2013.01); *F02B 37/025* (2013.01)

(58) Field of Classification Search
CPC ...... F02B 37/025; F02B 37/18; F02B 37/183; F02B 37/186; F16K 5/00–5/227; F16K 1/20; F16K 1/2014
See application file for complete search history.

(56) References Cited

U.S. PATENT DOCUMENTS

2020/0141309 A1    5/2020  Reif et al.
2021/0033022 A1 *  2/2021  Ebert ................. F02B 37/18

FOREIGN PATENT DOCUMENTS

DE    102015011256 A1    3/2016
DE    102016112523 A1    1/2018
(Continued)

*Primary Examiner* — Loren C Edwards
(74) *Attorney, Agent, or Firm* — Smartpat PLC

(57) ABSTRACT

A control device of an exhaust gas-conducting section of a turbocharger includes a pivotable closing device with a closing element and an element lever. A first element portion thereof opens and closes a first flow cross-section of a flow connection and a second element portion opens and closes a second flow cross-section of a bypass duct of the exhaust gas-conducting section. The element lever includes a lever end portion engaging into a cavity of the closing element. A holding element is fixedly connected to the closing element. The lever end portion includes a first contact surface and, axially spaced apart, a second contact surface. The first contact surface includes an axially-extending first partial surface and a radially-extending second partial surface connected to one another by a third partial surface. The partial surfaces are designed to be able to effect contact with the closing element.

11 Claims, 3 Drawing Sheets

(56) References Cited

FOREIGN PATENT DOCUMENTS

| | | |
|---|---|---|
| DE | 202018101705 U1 | 4/2018 |
| DE | 202018104140 U1 | 7/2018 |
| DE | 102017202132 A1 | 8/2018 |

* cited by examiner

CONTROL DEVICE OF AN EXHAUST GAS-CONDUCTING SECTION OF AN EXHAUST GAS TURBOCHARGER

CROSS-REFERENCE TO RELATED APPLICATION

This application is a national stage application, filed under 35 U.S.C. § 371, of International Patent Application PCT/DE2022/100427, filed on Jun. 8, 2022, which claims the benefit of German Patent Application DE 10 2021 117 020.6 filed on Jul. 1, 2021.

TECHNICAL FIELD

The disclosure relates to a control device of an exhaust gas-conducting section of an exhaust gas turbocharger.

BACKGROUND

Exhaust gas-conducting sections for exhaust gas turbochargers are known, having a regulating device for regulating a fluid, in general exhaust gas, which flows through the exhaust gas-conducting section. The regulating device is provided for opening and closing a bypass duct in the exhaust gas-conducting section, through which a fluid can flow, in order to bypass a turbine wheel of the exhaust gas-conducting section arranged rotatably in the exhaust gas-conducting section in a wheel chamber of the exhaust gas-conducting section. Furthermore, by means of the control device a through-flow opening formed between two spiral channels of the exhaust gas-conducting section can be opened or closed so that the exhaust gas can overflow from one spiral channel into the other and vice versa.

With the aid of such a regulating device it is possible to completely or partially bypass the turbine wheel at specific operating points of the exhaust gas turbocharger, in particular at operating points which have large flow quantities, thus permitting efficient operation of the exhaust gas turbocharger. The efficient operation of the exhaust gas turbocharger is dependent on a specific opening characteristic of the control device which is to be adapted to meet the requirements of a drive assembly connected to the exhaust gas turbocharger, in particular of an internal combustion engine.

The control device comprises a plurality of components which are connected to each other, wherein relative movements of individual components with respect to each other are also possible. Thus, with respect to a lever arm of the control device, which is designed for movement of the closing element and which receives the closing element at one end, a closing element of the control device, which is provided to close the bypass duct and/or the through-flow opening, comprises a possible movability relative to the lever arm. This possible movability is necessary in order that, e.g. during pivoting of the lever arm with the closing element, it is possible to avoid seizing up in the exhaust gas-conducting section. The relative movability of the two components with respect to each other causes wear on the control device during operation of the exhaust gas turbocharger, which it is necessary at least to reduce.

For instance, a control device for an exhaust gas turbocharger can be found in laid-open document DE 10 2017 202 132 A1 and comprises a closing element which is received on a lever arm of the control device. The lever arm protrudes into a cavity of the closing element. In order to reduce wear, one end of the lever arm, which protrudes into the cavity, is designed in portions so as to bring about contact with the closing element. For this purpose, the end of the lever arm comprises guide elements with guide surfaces which can come into contact with the closing element.

Utility model DE 20 2018 101 707 U1 likewise discloses a control device of an exhaust gas turbocharger which comprises a closing element and a lever arm protruding into the closing element, wherein the end of the lever arm comprises conical guide elements which are opposite a contact surface of the closing element curved to bring about sliding linear contact, or vice versa.

SUMMARY

The object of the present disclosure is to provide an improved control device of an exhaust gas-conducting section of an exhaust gas turbocharger.

This object is achieved with a control device of an exhaust-gas conducting section of an exhaust gas turbocharger as disclosed herein.

A control device of an exhaust gas-conducting section of an exhaust gas turbocharger comprises a closing device comprising a closing element and an element lever, wherein the closing device can pivot about an axis of rotation. The closing element is designed to open and close a first flow cross-section of the exhaust gas-conducting section, wherein the first flow cross-section is formed in a partition wall lying between a first spiral channel of the exhaust gas-conducting section and a second spiral channel of the exhaust gas-conducting section. The exhaust gas-conducting section comprises a second flow cross-section which is allocated to a bypass duct which is formed in the exhaust gas-conducting section and which is designed to bypass a flow against a turbine wheel formed in the exhaust gas-conducting section. The closing element comprises a first element portion for closing the first flow cross-section and a second element portion which can be used to close the second flow cross-section. The element lever comprises a lever end portion engaging into a cavity of the closing element. The closing element has a holding element which is fixedly connected to it and which is at least partially encompassed by the lever end portion.

The lever end portion comprises a first contact surface and a second contact surface which is axially spaced apart from the first contact surface with respect to a longitudinal axis of the closing element, wherein the first contact surface comprises an axially-extending first partial surface and a radially-extending second partial surface which are connected to one another by a third partial surface formed between the two partial surfaces, wherein the partial surfaces are designed to be able to effect contact with the closing element, and wherein the partial surfaces and a base of the closing element are planar.

The advantage is that of producing a contact surface which is as large as possible by reason of the three partial surfaces which are disposed differently relative to each other with respect to the longitudinal axis. This largest possible contact surface results in lower surface pressure for the mutually contacting components compared to a smaller contact surface, which leads to a reduction in wear.

A further advantage of the large contact surface is an increase in heat transfer of the closing element heated by reason of the high exhaust gas temperatures via the lever end portion into the element lever, and from there into the exhaust gas-conducting section which has a greater heat absorption capacity, without substantial changes in expansion, than the closing element.

Therefore, a substantially better control device than in the prior art is provided, the closing device of which is characterised by reduced wear and therefore by higher operating reliability and a long service life which is extended compared to the prior art. Furthermore, noise emission is reduced.

Therefore, all in all, a control device for an exhaust gas turbocharger is provided which, by reason of the shape of the control device, under the exhaust gas pressures and exhaust gas pulsations which occur, limits excessive movement of the closing element or a relative movement between the element lever and the closing element so that excessive friction between the closing element and the element lever in the region of their—in particular—axial contact surfaces is avoided.

If, however, wear occurs on the axial contact surfaces, this leads to contact between inclined surfaces, in particular conical surfaces, whereby the contact surfaces are enlarged and further wear is stopped or at least slowed down, just as it is by reason of a further limitation to the relative movement which is also brought about. The radial contact surfaces of the two components limit a tumbling movement of the closing element brought about by the exhaust gas pulsation.

Further advantages, features and details of the invention will be apparent from the following description of preferred exemplified embodiments and with reference to the drawing. The features and combinations of features mentioned earlier in the description and the features and combinations of features mentioned hereinunder in the description of the figures and/or illustrated in the figures alone can be employed not only in the combination stated in each case but also in other combinations or on their own, without departing from the scope of the invention. Like or functionally identical elements are allocated identical reference signs.

DETAILED DESCRIPTION

Figure 1:
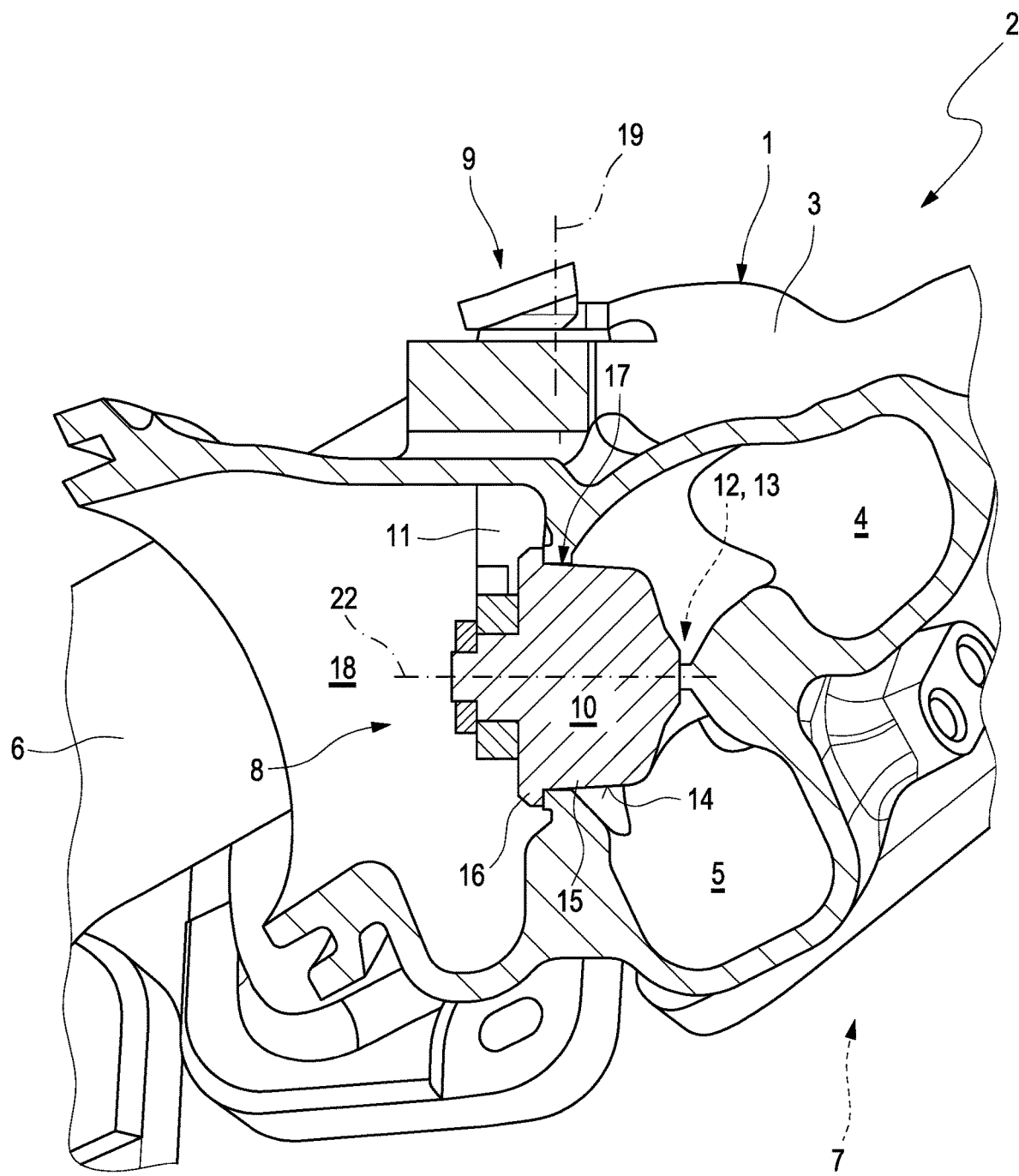
FIG. 1 shows a perspective view of a cross-section along a plane of cut through an exhaust gas-conducting section of an exhaust gas turbocharger with a control device according to the prior art.

An exhaust gas-conducting section 1, in accordance with the invention, of an exhaust gas turbocharger 2, which conducting section is designed according to FIG. 1 and has a flow pass through it, comprises an inlet channel 3 to allow a fluid flow to enter the exhaust gas-conducting section 1, in general exhaust gas of an internal combustion engine 7, a first spiral channel 4 and a second spiral channel 5 downstream of the inlet channel 3 to condition the flow, and an outlet channel, not illustrated in greater detail, downstream of the spiral channels 4, 5, via which the exhaust gas can escape from the exhaust gas-conducting section 1 in a directed manner. Formed between the spiral channels 4, 5 and the outlet channel is a wheel chamber, not illustrated in greater detail, in which a turbine wheel, not illustrated in greater detail, is rotatably received.

In the present exemplified embodiment, the exhaust gas-conducting section 1 is connected to an exhaust gas manifold 6 of the internal combustion engine 7 so that the exhaust gas from the internal combustion engine 7 can enter into the spiral channels 4, 5 via the inlet channel 3 in order to act upon the turbine wheel.

In order to adapt an operating behaviour of the exhaust gas turbocharger 2 to the fluid flow of the internal combustion engine 7, and therefore to the internal combustion engine 7, a control device 8 for separating and connecting the first spiral channel 4 and the second spiral channel 5 is disposed in the exhaust gas-conducting section 1. The control device 8 comprises a closing device 9 comprising a closing element 10 and an element lever 11, wherein the element lever 11 is designed to pivot the closing element 10 by a pivot angle.

In order to separate and to connect the two spiral channels 4, 5 the closing element 10 is disposed in a through-flow opening 12 which is designed in such a way, that the two spiral channels 4, 5 have a flow pass through each other.

In a first position, the closing position of the closing element 10, as shown in FIG. 1, the two spiral channels 4, 5 have a flow pass through them in a completely mutually separated manner, wherein the through-flow opening 12 is completely closed by the closing element 10. The exhaust gas of the internal combustion engine 7 flows through the two spiral channels 4, 5, wherein a first part of the exhaust gas flows through the first spiral channel 4 and a second part of the exhaust gas flows through the second spiral channel 5.

In a second position of the closing element 10, which is not shown in more detail, the through-flow opening 12 is completely open and exhaust gas can overflow out of the first spiral channel 4 into the second spiral channel 5, and vice versa. This means that exhaust gas can overflow from one spiral channel 4; 5 into the other spiral channel 5; 4 via the through-flow opening 12 which comprises a first flow cross-section 13.

The closing element 10 is to be positioned between the first position and the second position into further intermediate positions, and so the first flow cross-section 13 can be adapted to a corresponding requirement to achieve the best possible efficiency of the exhaust gas turbocharger 2 according to the through-flowing exhaust gas quantity.

In order to bring about a preferable opening of the first flow cross-section 13, the closing element 10 is designed comprising a pot-shaped outer contour 14.

The closing element 10 comprises a first element portion 15 for closing the first flow cross-section 13 and a second element portion 16 which can be used to close a second flow cross-section 17 formed in the exhaust gas-conducting section 1.

The second flow cross-section 17 is provided to flow around the turbine wheel. In other words, this means that the exhaust gas flowing through the second flow cross-section 17 is led past the turbine wheel, and the turbine wheel is not acted upon by this exhaust gas flowing through the second flow cross-section 17. The second flow cross-section 17 is formed in a bypass duct 18 which is conventionally designated as a so-called wastegate duct. The closing device 9 can pivot about an axis of rotation 19.

Figure 2:
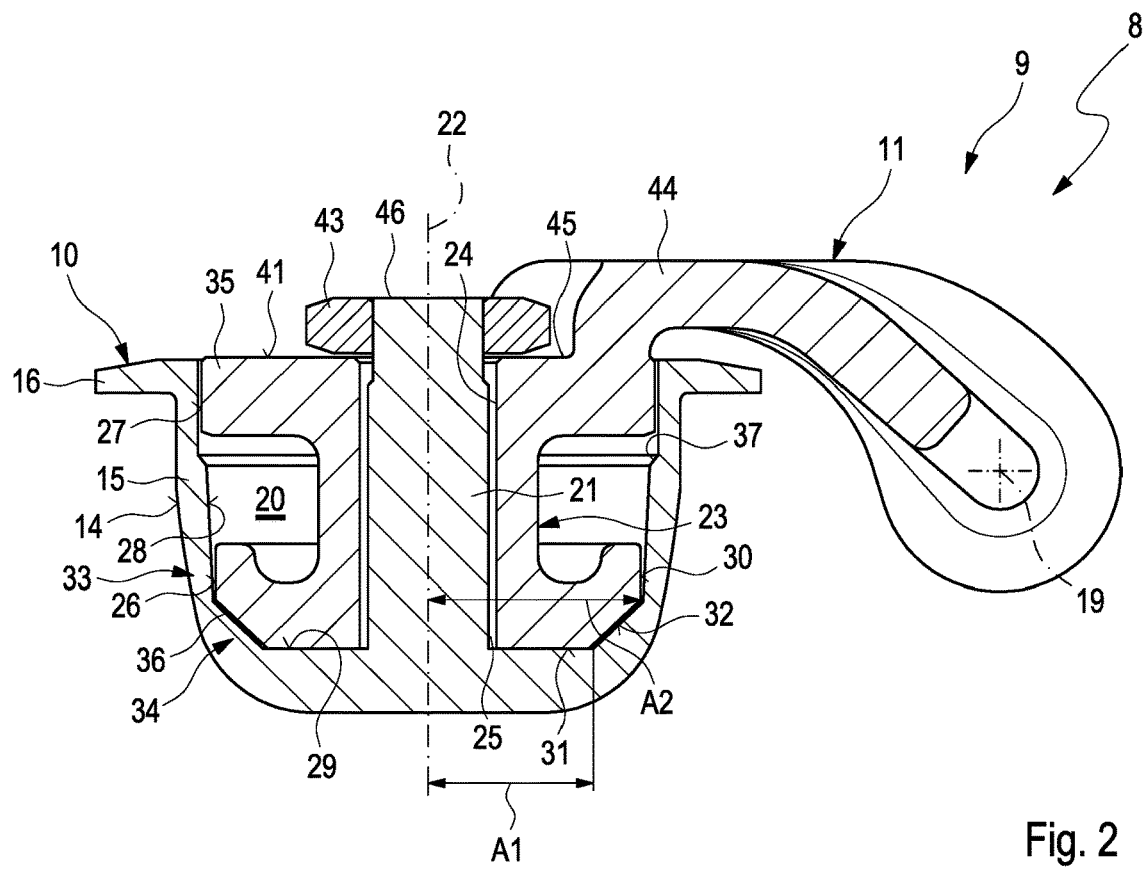
FIG. 2 shows a partial cross-sectional view of a closing device of a control device in accordance with the invention in a first relative position.
Figure 3:
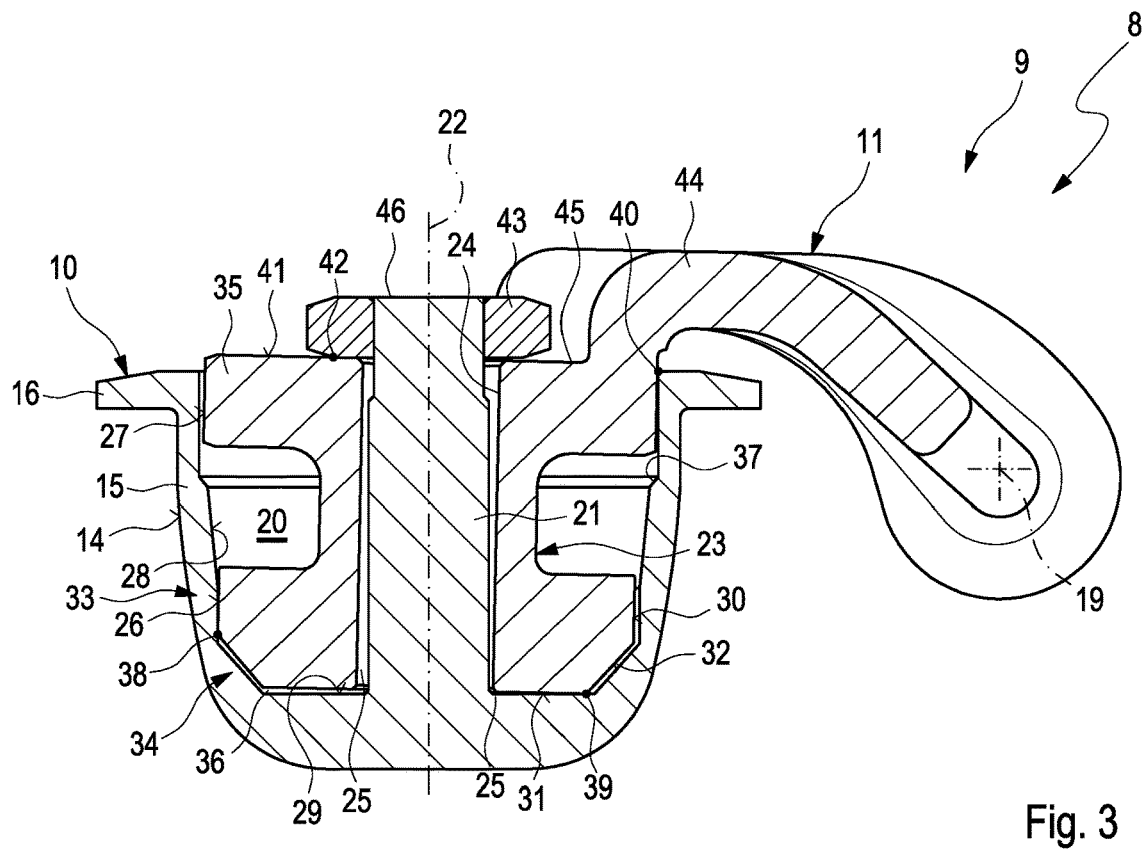
FIG. 3 shows a partial cross-sectional view of the closing device of the control device in accordance with the invention, in a second exemplified embodiment, in a second relative position.
Figure 4:
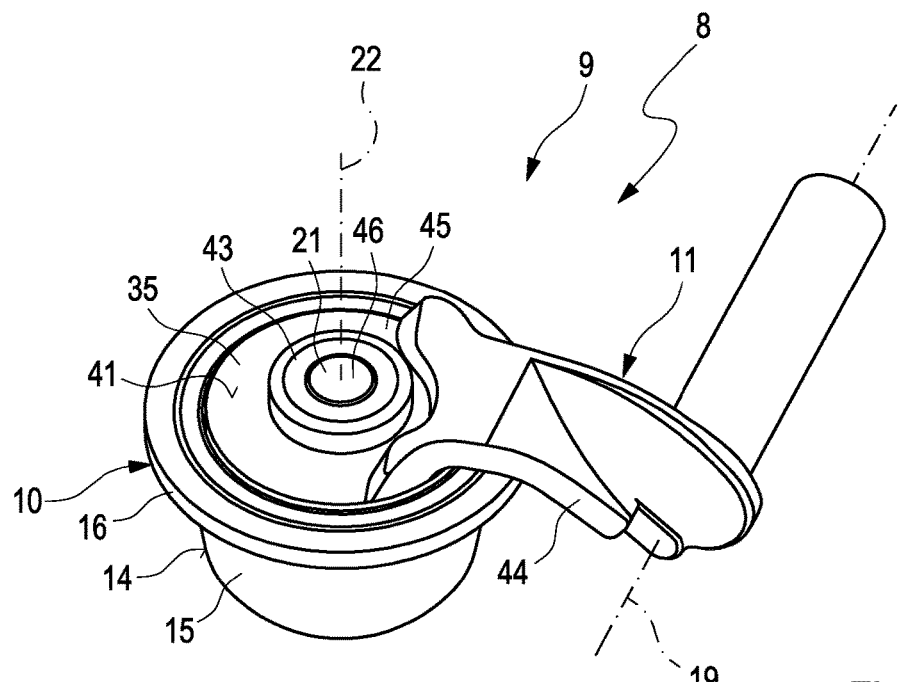
FIG. 4 shows a plan view of the closing device of FIG. 2.

The closing element 10, depicted in FIGS. 2 to 4, of the control device 8 in accordance with the invention also has an approximately pot-shaped outer contour 14, wherein, in a cavity 20 of the closing element 10, a pin-shaped holding element 21 extends along a longitudinal axis 22 of the closing element 10.

The holding element 21 is designed to receive the element lever 11, wherein a lever end portion 23 of the element lever 11 extends into the cavity 20 and receives the holding element 21 in a through opening 24 formed in the lever end portion 23. In other words, this means that the closing element 10 comprises the holding element 21 fixedly connected thereto in a manner encompassed by the lever end portion 23.

In order to avoid seizing of the closing element 10 during operation of the exhaust gas turbocharger 2, a movement gap 25 is formed between the holding element 21 and the lever end portion 23.

The lever end portion 23 comprises a first contact surface 26 and a second contact surface 27 which are opposite an inner wall 28 of the closing element 10 which defines the cavity 20. The first contact surface 26 is spaced apart from the second contact surface 27 along the longitudinal axis 22 in order to reduce overall body contact between the lever end portion 23 and the closing element 10 and therefore to reduce the wear between the element lever 11 and the closing element 10. In the same way, noise emission can thereby be reduced owing to a reduced overall body contact.

The first contact surface 26, which faces a base 29 of the inner wall 28, has an axially extending first partial surface 30 and a radially extending second partial surface 31, which are connected to each other by a third partial surface 32 formed between the two partial surfaces 30, 31, wherein the partial surfaces 30, 31, 32 are designed to effect contact with the inner wall 28 and therefore with the closing element 10. The first partial surface 30 and the third partial surface 32 are annular, wherein the third partial surface 32 is inclined with respect to the longitudinal axis 22 of the closing element 10.

A first partial portion 33 of the lever end portion 23, which comprises the first partial surface 30, is cylindrical or frustoconical at least in terms of its outer contour. A second partial portion 34 of the lever end portion 23, which comprises the second partial surface 31 and the third partial surface 32, is frustoconical at least in terms of its outer contour, wherein, however, a cone angle of the first partial portion 33 is to be smaller than a cone angle of the second partial portion 34. Therefore, a first distance A1 of the third partial surface 32 from the longitudinal axis 22, which is formed on the second partial surface 31, is smaller than a second distance A2 of the third partial surface 32 from the longitudinal axis 22 which is formed on the first partial surface 30.

The second contact surface 27 is allocated to an element ring 35 of the lever end portion 23 and serves to cover the cavity 20. The element ring 35 can comprise the second contact surface 27 inclined with respect to the longitudinal axis 22. In the same way, the contact surface 27 can be parallel to the longitudinal axis 22.

The second contact surface 27 is spaced apart from the longitudinal axis 22 unequally to the first contact surface 26. In the present exemplified embodiment, the distance of the second contact surface 27 from the longitudinal axis 22 is greater than the distance of the first contact surface 26 from the longitudinal axis 22.

The inner wall 28 is designed in a virtually complementary manner around the lever end portion 23, in particular with respect to the contact surfaces 26, 27, thus forming a further movement gap 36. In the present exemplified embodiment, it comprises a step 37 which can be used to limit maximum tilting of the closing element 10 relative to the lever end portion 23.

FIG. 2 shows the closing device 9 of the control device 8 in accordance with the invention in a first exemplified embodiment, wherein it is illustrated in a first relative position, in which the closing element 10 and the lever end portion 23 are positioned without relative tilting with respect to each other. FIG. 3 shows the closing device 9 of the control device 8 in accordance with the invention in a second exemplified embodiment, wherein it is illustrated in a second relative position, comprising tilting of the closing element 10 relative to the lever end portion 23 or vice versa.

The maximum tilting of the closing element 10 relative to the lever end portion 23 should preferably not exceed 1.35°. In order that this maximum tilting can be respected, the first contact surface 26 comprises at least one first contact point 38 and one second contact point 39 which are spaced apart from each other axially and radially with respect to the longitudinal axis 22. In order to further ensure the maximum tilting, the second contact surface 27 comprises at least one third contact point 40. Furthermore, the element ring 35 has a fourth contact point 42 on its annular surface 41 which is transverse to the second contact surface 27.

For secured connection of the closing element 10 to the lever end portion 23 a securing element 43 is provided which is positioned opposite to the annular surface 41, wherein it is disposed on an element end 46 of the holding element 21 remote from a base 29 of the closing element 10.

FIG. 4 shows a plan view of the closing device 9 according to FIG. 2. A lever arm 44 of the element lever 11, receiving the lever end portion 23, is curved at its end 45 which faces the lever end portion 23 so that breaks in flow are avoided or at least reduced.

Figure 5:
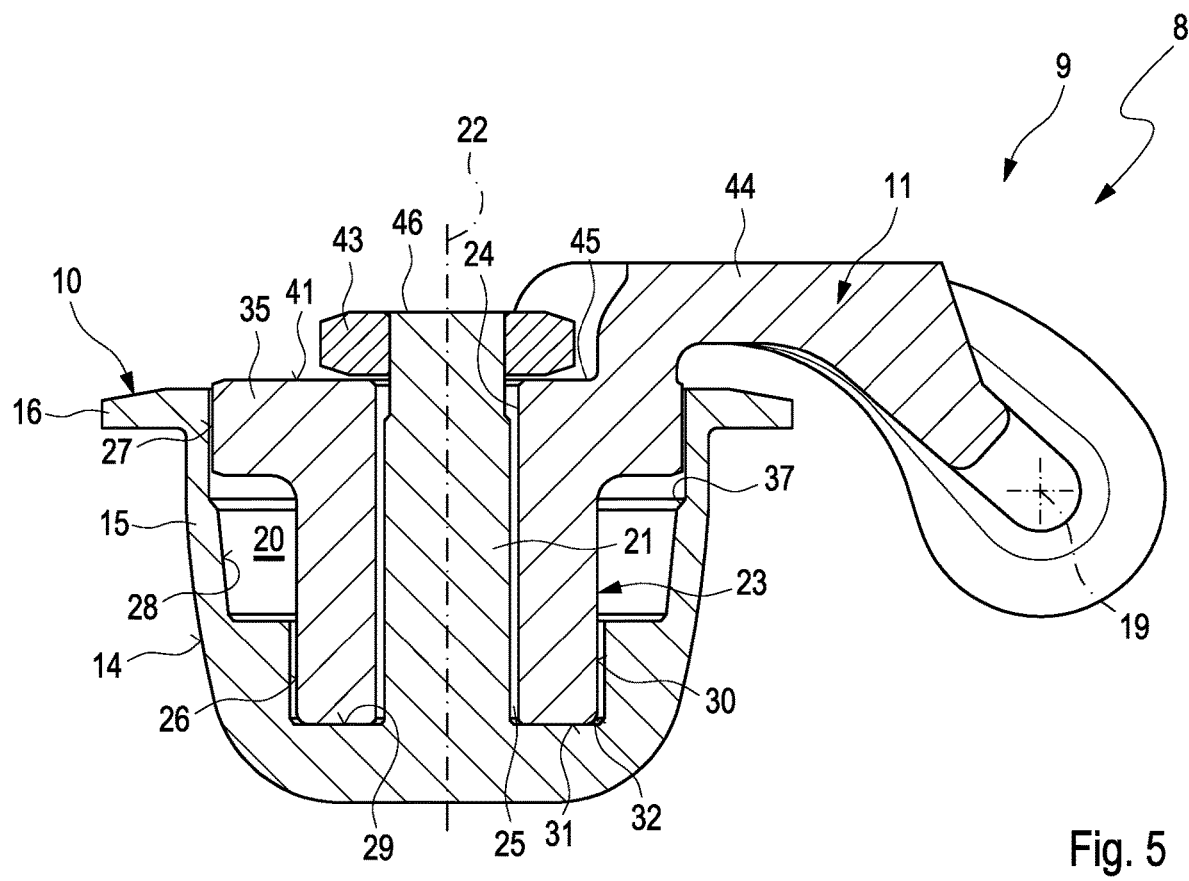
FIG. 5 shows a partial cross-sectional view of the closing device of the control device in accordance with the invention, in a third exemplified embodiment, in the first relative position.

The closing device 9 of the control device 8 in accordance with the invention is illustrated in FIG. 5 in a third exemplified embodiment. The third partial surface 32 is rounded.

The first contact surface 26 is obtained with the aid of the three partial surfaces 30, 31, 32 which are disposed differently with respect to the longitudinal axis 22. Therefore, secured closing of the first flow cross-section 13 and/or of the second flow cross-section 17 is to be achieved even under different operating conditions.

LIST OF REFERENCE SIGNS

1 Exhaust gas-conducting section
2 Exhaust gas turbocharger
3 Inlet channel
4 First spiral channel
5 Second spiral channel
6 Exhaust gas manifold
7 Internal combustion engine
8 Control device
9 Closing device
10 Closing element
11 Element lever
12 Through-flow opening
13 First flow cross-section
14 Outer contour
15 First element portion
16 Second element portion
17 Second flow cross-section
18 Bypass duct
19 Axis of rotation
20 Cavity 21 Holding element
22 Longitudinal axis
23 Lever end portion
24 Through-opening
25 Movement gap
26 First contact surface
27 Second contact surface
28 Inner wall
29 Base
30 First partial surface
31 Second partial surface
32 Third partial surface
33 First partial portion
34 Second partial portion
35 Element ring
36 Further movement gap
37 Step
38 First contact point
39 Second contact point
40 Third contact point
41 Annular surface
42 Fourth contact point
43 Securing element
44 Lever arm
45 End
46 Element end
A1 First distance
A2 Second distance

The invention claimed is:

1. A control device of an exhaust gas-conducting section of an exhaust gas turbocharger, comprising:
a closing device (9) comprising
a closing element (10) and
an element lever (11),
wherein the closing device (9) is configured to pivot about an axis of rotation (19), and
wherein the closing element (10) is configured to open and close a first flow cross-section (13) of the exhaust gas-conducting section (1),
wherein the first flow cross-section (13) is formed in a partition wall lying between a first spiral channel (4) of the exhaust gas-conducting section (1) and a second spiral channel (5) of the exhaust gas-conducting section (1), and
wherein the exhaust gas-conducting section (1) comprises a second flow cross-section (17) of a bypass duct (18) formed in the exhaust gas-conducting section (1), the bypass duct is configured to bypass a flow against a turbine wheel formed in the exhaust gas-conducting section (1), and
wherein the closing element (10) comprises
a first element portion (15) configured to close the first flow cross-section (13) and
a second element portion (16) configured to close the second flow cross-section (17), and
wherein the element lever (11) comprises a lever end portion (23) engaging into a cavity (20) of the closing element (10), and
wherein the closing element (10) comprises a holding element (21) fixedly connected thereto and encompassed by the lever end portion (23), and
wherein the lever end portion (23) comprises
a first contact surface (26) and
a second contact surface (27) axially spaced apart from the first contact surface (26) with respect to a longitudinal axis (22) of the closing element (10),
wherein the first contact surface (26) comprises an axially-extending first partial surface (30) and a radially-extending second partial surface (31),
wherein the axially-extending first partial surface (30) and the radially-extending second partial surface (31) are connected to one another by a third partial surface (32) formed between the axially-extending first partial surface (30) and the radially-extending second partial surface (31),
wherein each of the partial surfaces (30, 31, 32) is configured to contact the closing element (10), and
wherein each of the partial surfaces (30, 31, 32) and a base (29) of the closing element (10) are planar, and
wherein the three partial surfaces (30, 31, 32) are formed contiguously and opposite an inner wall (28) and the base (29), and
wherein the lever end portion (23) further comprises
a first partial portion (33), comprising the first partial surface (30), and
a second partial portion (34) comprising the second partial surface (31) and the third partial surface (32),
wherein the second partial portion (34) is frustoconical.

2. The control device as claimed in claim 1, wherein the first partial surface (30) and the third partial surface (32) are annular.

3. The control device as claimed in claim 1, wherein the third partial surface (32) is inclined with respect to the longitudinal axis (22).

4. The control device as claimed in claim 3, wherein a first distance (A1) of the third partial surface (32) from the longitudinal axis (22), is smaller than a second distance (A2) of the third partial surface (32) from the longitudinal axis (22).

5. The control device as claimed in claim 1, wherein the second contact surface (27) is spaced apart from the longitudinal axis (22) unequally to the first contact surface (26).

6. The control device as claimed in claim 1, wherein the inner wall (28) defines the cavity (20) and comprises at least one step (37).

7. The control device as claimed in claim 1, wherein between the closing element (10) and the lever end portion (23) during maximum tilting of the closing element (10) relative to the lever end portion (23), the first contact surface (26) comprises at least one first contact point (38) and one second contact point (39), and
wherein the at least one first contact point (38) and the at least one second contact point (39) are spaced apart from each other axially and radially with respect to the longitudinal axis (22).

8. The control device as claimed in claim 1, wherein, between the closing element (10) and the lever end portion (23) during maximum tilting of the closing element (10) relative to the lever end portion (23), the second contact surface (27) comprises at least one third contact point (40).

9. The control device as claimed in claim 1, wherein an element ring (35) of the lever end portion (23) is formed on an annular surface (41), and
wherein the annular surface is transverse to the second contact surface (27), so as to provide a fourth contact point (42).

10. The control device as claimed in claim 1, wherein the holding element (21) comprises a securing element (43) disposed on an element end (46) remote from the base (29) of the closing element (10).

11. The control device as claimed in claim 1, wherein a lever arm (44) of the element lever (11), receiving the lever end portion (23), is curved at an end (45) facing the lever end portion (23).

\* \* \* \* \*